United States Patent
Kuroki

(10) Patent No.: US 9,193,085 B2
(45) Date of Patent: Nov. 24, 2015

(54) METHOD AND DEVICE FOR TRANSFER CUTTING STRIP-SHAPED RUBBER MEMBER

(75) Inventor: Yuuzo Kuroki, Kawasaki (JP)

(73) Assignee: BRIDGESTONE CORPORATION, Tokyo (JP)

( * ) Notice: Subject to any disclaimer, the term of this patent is extended or adjusted under 35 U.S.C. 154(b) by 267 days.

(21) Appl. No.: 14/114,066

(22) PCT Filed: May 1, 2012

(86) PCT No.: PCT/JP2012/002955
§ 371 (c)(1),
(2), (4) Date: Oct. 25, 2013

(87) PCT Pub. No.: WO2012/150662
PCT Pub. Date: Nov. 8, 2012

(65) Prior Publication Data
US 2014/0047963 A1    Feb. 20, 2014

(30) Foreign Application Priority Data

May 2, 2011    (JP) .................. 2011-102896

(51) Int. Cl.
*B29D 30/38*    (2006.01)
*B29D 30/46*    (2006.01)
*B26D 7/06*    (2006.01)
*B65H 5/02*    (2006.01)
*B65H 5/04*    (2006.01)
(Continued)

(52) U.S. Cl.
CPC .............. *B26D 7/0633* (2013.01); *B29D 30/46* (2013.01); *B65H 5/021* (2013.01); *B65H 5/04* (2013.01);
(Continued)

(58) Field of Classification Search
CPC ................... B65H 2301/4473; B65H 2220/01; B65H 2403/512; B65H 2403/514; B65H 2701/1111; B65H 2801/93; B65H 29/16; B65H 35/06; B65H 5/021; B65H 5/04; B26D 7/0633; B29D 2030/463; B29D 30/46; Y10T 83/0448; Y10T 83/2183
See application file for complete search history.

(56) References Cited

U.S. PATENT DOCUMENTS 3,789,712 A * 2/1974 Enders ................... B26D 1/105
83/171
6,125,994 A    10/2000 Todome
(Continued)

FOREIGN PATENT DOCUMENTS

DE    102007001151 A1 *    7/2008
JP    58168439 A    10/1983
(Continued)

OTHER PUBLICATIONS

Communication dated Jan. 7, 2015, issued by the State Intellectual Property Office of the People's Republic of China in counterpart Application No. 201280021708.4.
(Continued)

*Primary Examiner* — Stephen Choi
(74) *Attorney, Agent, or Firm* — Sughrue Mion, PLLC

(57) ABSTRACT

At the time of transfer of a strip-shaped rubber member (15) onto a belt conveyor (12) by a transfer unit, support members (61), each of which is provided on one width-direction side of a corresponding belt (51) and is projectable from a conveying surface of the belt (51), are lifted by a lifting/lowering unit (71) to project from the conveying surface of the belts (51), so that the strip-shaped rubber member (15) is raised from the conveying surface of the belts (51). Therefore, the strip-shaped rubber member (15) is not in sliding contact with the conveying surface of the belts (51) at the time of transfer. As a result, a situation whereby the belts (51) are dragged by the strip-shaped rubber member (15) so that one width-direction edge portion thereof is turned up can be prevented.

6 Claims, 4 Drawing Sheets

(51) Int. Cl.
*B65H 35/06* (2006.01)
*B65H 29/16* (2006.01)

(52) U.S. Cl.
CPC .............. *B65H 29/16* (2013.01); *B65H 35/06* (2013.01); *B29D 2030/463* (2013.01); *B65H 2301/4473* (2013.01); *B65H 2403/512* (2013.01); *B65H 2403/514* (2013.01); *B65H 2701/1111* (2013.01); *B65H 2801/93* (2013.01); *Y10T 83/0448* (2015.04); *Y10T 83/2183* (2015.04)

(56) References Cited

U.S. PATENT DOCUMENTS 8,726,961 B2 * 5/2014 Druet .................. B29D 30/42
156/379.6
2004/0047661 A1 3/2004 Weinlich et al.
2011/0192538 A1 * 8/2011 Miyahara ............... B29D 30/42
156/297

FOREIGN PATENT DOCUMENTS

| JP | 7-9532 U | 2/1995 |
| JP | 8-85015 A | 4/1996 |
| JP | 09165120 A | 6/1997 |
| JP | 10181925 A | 7/1998 |
| JP | 11-221860 A | 8/1999 |

OTHER PUBLICATIONS

International Search Report of PCT/JP2012/002955 dated Jun. 19, 2012.

* cited by examiner

METHOD AND DEVICE FOR TRANSFER CUTTING STRIP-SHAPED RUBBER MEMBER

CROSS REFERENCE TO RELATED APPLICATIONS

This application is a National Stage of International Application No. PCT/JP2012/002955, filed on May 1, 2012, which claims priority from Japanese Patent Application No. 2011-102896, filed on May 2, 2011, the contents of all of which are incorporated herein by reference in their entirety.

TECHNICAL FIELD

The present invention relates to a method and device for transfer cutting a strip-shaped rubber member that transfer a strip-shaped rubber member onto a belt conveyor, the strip-shaped rubber member being at an inclination with respect to the belt conveyor, and then cut the strip-shaped rubber member along the belt conveyor so as to cut off sheet pieces one after another.

BACKGROUND ART

An example of a conventional method and device for transfer cutting a strip-shaped rubber member is disclosed in JP11-221860A (PTL 1).

The device disclosed in PTL 1 is provided with a belt conveyor having a belt that can run in the longitudinal direction; a transfer unit that, while holding a tip portion of a strip-shaped rubber member inclined with respect to the belt conveyor, moves the strip-shaped rubber member in the longitudinal direction thereof so as to transfer the strip-shaped rubber member onto the belt conveyor; and a cutting unit that cuts a sheet piece off of the strip-shaped rubber member by, at one width-direction edge of the belt conveyor, cutting the strip-shaped rubber member on the belt conveyor in the longitudinal direction of the belt conveyor, the cut-off sheet piece being transported in the longitudinal direction of the belt conveyor by running of the belt.

CITATION LIST

Patent Literature

PTL 1: JP11-221860A

SUMMARY OF INVENTION

In such a conventional method and device for transfer cutting a strip-shaped rubber member, when the transfer unit transfers the strip-shaped rubber member onto the belt conveyor while holding a tip portion thereof, the tip portion of the strip-shaped rubber member is slightly raised by the transfer unit and thus is not in sliding contact with the conveying surface of the belt. Due to its own weight, however, the portion of the strip-shaped rubber member after the tip portion slides against the conveying surface of the belt with a certain pressure. As a result, at the time of transfer of the strip-shaped rubber member, the belt is dragged by the strip-shaped rubber member so that a width-direction edge portion thereof is turned up, leading to problems such as defective cutting and defective transport of the strip-shaped rubber member. As the width of the strip-shaped rubber member increases, such problems become more salient.

It is an object of the present invention to provide a method and device for transfer cutting a strip-shaped rubber member that, at the time of transfer of the strip-shaped rubber member onto a belt conveyor, can reliably prevent the belt from being turned up.

A method, according to the present invention, for transfer cutting a strip-shaped rubber member includes the steps of transferring the strip-shaped rubber member onto a belt conveyor by a transfer unit moving the strip-shaped rubber member in a longitudinal direction of the strip-shaped rubber member while holding a tip portion thereof, the strip-shaped rubber member being at an inclination with respect to the belt conveyor, the belt conveyor including a belt running in a longitudinal direction of the belt conveyor; cutting off a sheet piece from the strip-shaped rubber member by a cutting unit cutting the strip-shaped rubber member on the belt conveyor in the longitudinal direction of the belt conveyor at one width-direction side of the belt conveyor, yielding a cut-off sheet piece; and transporting, by the belt conveyor, the cut-off sheet piece in the longitudinal direction of the belt conveyor. At a time of transfer of the strip-shaped rubber member by the transfer unit, a support member is lifted by a lifting/lowering unit to project from a conveying surface of the belt, the support member being provided at one width-direction side of the belt and being projectable from the conveying surface of the belt, so that the strip-shaped rubber member is raised from the conveying surface of the belt.

A device, according to the present invention, for transfer cutting a strip-shaped rubber member includes a belt conveyor including a belt running in a longitudinal direction of the belt conveyor; a transfer unit configured to transfer the strip-shaped rubber member onto the belt conveyor by moving the strip-shaped rubber member in a longitudinal direction of the strip-shaped rubber member while holding a tip portion thereof, the strip-shaped rubber member being at an inclination with respect to the belt conveyor; and a cutting unit configured to cut off a sheet piece from the strip-shaped rubber member by cutting the strip-shaped rubber member on the belt conveyor in the longitudinal direction of the belt conveyor at one width-direction side of the belt conveyor, yielding a cut-off sheet piece. The belt conveyor transports the cut-off sheet piece in the longitudinal direction of the belt conveyor. A support member, at one width-direction side of the belt, projectable from a conveying surface of the belt, is provided along with a lifting/lowering unit configured to lift and lower the support member. At a time of transfer of the strip-shaped rubber member by the transfer unit, the support member is lifted by the lifting/lowering unit to project from the conveying surface of the belt, so that the strip-shaped rubber member is raised from the conveying surface of the belt.

In the device, according to the present invention, for transfer cutting a strip-shaped rubber member, the lifting/lowering unit preferably includes a plurality of eccentric cams that, by rotating synchronously, cause the support member to translate vertically, and a movement mechanism that causes the eccentric cams to rotate synchronously.

In the device, according to the present invention, for transfer cutting a strip-shaped rubber member, the movement mechanism preferably includes a carrier that, by running, causes the eccentric cams to rotate synchronously, and a cylinder that applies a driving force for running to the carrier.

In the device, according to the present invention, for transfer cutting a strip-shaped rubber member, the belt conveyor preferably includes a plurality of belts running synchronously in parallel, and the support member is preferably provided at one width-direction side of each of the belts positioned at least at one width-direction side portion of the belt conveyor.

In the device, according to the present invention, for transfer cutting a strip-shaped rubber member, the strip-shaped rubber member preferably includes a plurality of reinforcing cords extending in the longitudinal direction of the strip-shaped rubber member and a coating rubber covering the reinforcing cords, and an inclination angle of the strip-shaped rubber member with respect to the belt conveyor is preferably changeable within a range of 15° to 90°.

In the present invention, at the time of transfer of the strip-shaped rubber member onto the belt conveyor by the transfer unit, the support member is lifted by the lifting/lowering unit to project from the conveying surface of the belt, the support member being provided at one width-direction side of the belt and being projectable from the conveying surface of the belt, so that the strip-shaped rubber member is raised from the conveying surface of the belt. Therefore, the strip-shaped rubber member is not in sliding contact with the conveying surface of the belt at the time of transfer. As a result, a situation whereby the belt is dragged by the strip-shaped rubber member so that one width-direction edge portion thereof is turned up can be prevented, thus easily and reliably preventing defective cutting and defective transport of the strip-shaped rubber member.

The lifting/lowering unit that lifts and lowers the support member can be manufactured inexpensively and with a simple structure by forming the lifting/lowering unit from the plurality of eccentric cams that, by rotating synchronously, cause the support member to translate vertically, and from the movement mechanism that causes the eccentric cams to rotate synchronously, and in particular by forming the movement mechanism from the carrier that, by running, causes the eccentric cams to rotate synchronously, and from the cylinder that applies a driving force for running to the carrier.

Furthermore, when the belt conveyor includes the plurality of belts running synchronously in parallel, and the support member is provided at one width-direction side of each of the belts positioned at least at one width-direction side portion of the belt conveyor, the belts positioned at one width-direction side of the belt conveyor easily turn up. Therefore, providing the support member at one width-direction side of each of these belts reliably prevents the belts from turning up.

When the strip-shaped rubber member includes the plurality of reinforcing cords extending in the longitudinal direction of the strip-shaped rubber member and the coating rubber covering the reinforcing cords, and the inclination angle of the strip-shaped rubber member with respect to the belt conveyor is changeable within a range of 15° to 90°, then the cutoff sheet piece can be used for formation of both a belt layer and a carcass layer for a pneumatic tire, thereby promoting dual use of the device.

BRIEF DESCRIPTION OF DRAWINGS

The present invention will be further described below with reference to the accompanying drawings, wherein.

DESCRIPTION OF EMBODIMENTS

The following describes Embodiment 1 of the present invention based on the drawings.

Figure 1:
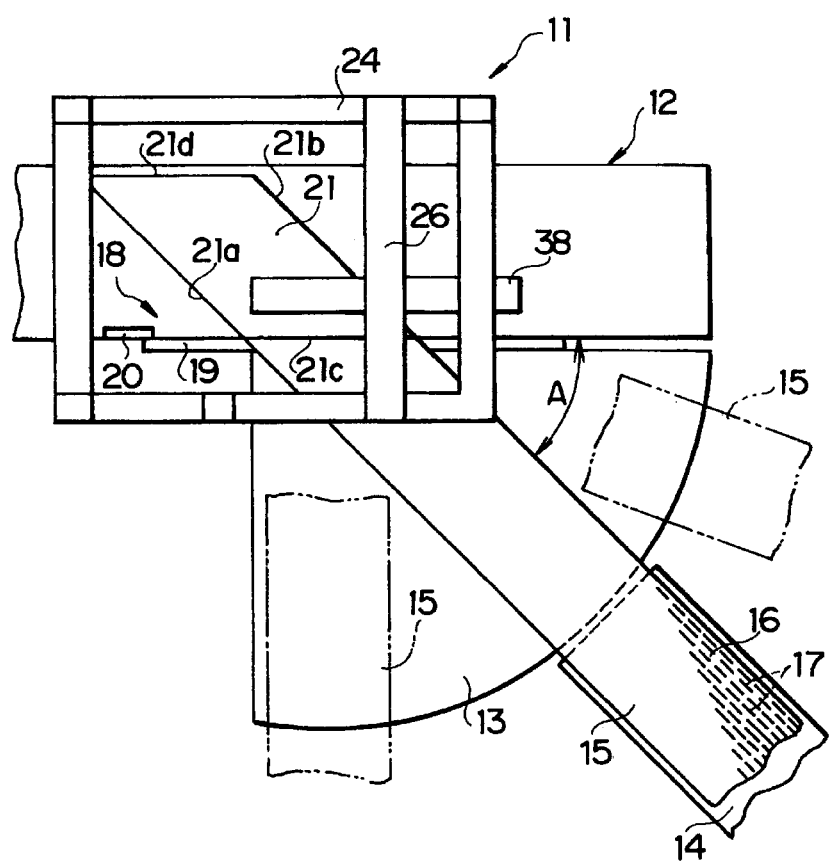
FIG. 1 is a plan view schematically illustrating Embodiment 1 of the present invention.

In FIG. 1, reference number 11 indicates a transfer cutting device. The transfer cutting device 11 includes a horizontal belt conveyor 12 extending in the front-back direction. The belt conveyor 12 can transport material in the longitudinal direction thereof, forwards in this example, by receiving driving power from a non-illustrated drive source. Reference number 13 indicates a horizontal, flat-plate auxiliary stand provided at a rear end portion of the belt conveyor 12, near one width-direction side (the left side) of the belt conveyor 12. The auxiliary stand 13 has the shape of a ¼ circle spreading towards the back left. Reference number 14 indicates a feed conveyor extending linearly and inclined at a predetermined inclination angle A with respect to the belt conveyor 12. The feed conveyor 14 can transport a strip-shaped rubber member 15, inclined at the same inclination angle A with respect to the belt conveyor 12 by extending in parallel to the feed conveyor 14, towards the belt conveyor 12 while supporting the strip-shaped rubber member 15 from below.

The strip-shaped rubber member 15 is configured with a plurality of reinforcing cords 17 and coating rubber 16 that covers the reinforcing cords 17. The reinforcing cords 17 are formed from organic fiber, steel, or the like, in this case steel cords, and extend in the longitudinal direction. The tip of the feed conveyor 14 is placed near the arc-like outer periphery of the auxiliary stand 13 and can swivel (oscillate) centering on the center of curvature of the outer periphery of the auxiliary stand 13. Reference number 18 indicates a cutting unit placed at one width-direction side of the belt conveyor 12, more specifically near the border between the belt conveyor 12 and the auxiliary stand 13. The cutting unit 18 includes an anvil 19 extending in the longitudinal direction of the belt conveyor 12, i.e. in the front-back direction, and a disc-shaped cutter 20 that moves along the anvil 19 while rotating.

After the strip-shaped rubber member 15 is transferred a predetermined distance on the belt conveyor 12 as described below, the cutting unit 18 operates, and the cutter 20 moves along the anvil 19, so that the strip-shaped rubber member 15 is cut in the longitudinal direction of the belt conveyor 12 at one width-direction side of the belt conveyor 12 (a direction at an inclination with respect to the width direction of the strip-shaped rubber member 15). A sheet piece 21, in the shape of a parallelogram (including a rectangle) with a front edge 21*a* and back edge 21*b* parallel to the feed conveyor 14, and a left edge 21*c* and right edge 21*d* parallel to the belt conveyor 12, is thus cut from the strip-shaped rubber member 15. Note that in the present embodiment, the cutting unit 18 is configured with the anvil 19 and the disc-shaped cutter 20, yet in the present invention, the cutting unit may be configured with an anvil and a guillotine-type cutter. As long as the strip-shaped rubber member 15 on the belt conveyor 12 can be cut in the longitudinal direction of the belt conveyor 12 at one width-direction side of the belt conveyor 12 so that the sheet piece 21 is cut from the strip-shaped rubber member 15, any configuration is acceptable.

When the sheet piece 21 is cut from the strip-shaped rubber member 15 by the cutting unit 18 as described above, a sheet piece 21 that has already been cut off is on the belt conveyor 12. The front edge 21*a* of the newly cut sheet piece 21 and the back edge 21*b* of the sheet piece 21 cut immediately before are inclined in the same direction at the same angle and abut against each other. Subsequently, when the belt conveyor 12 operates and the sheet piece 21 is transported forward, the back edge 21*b* of the sheet piece 21 located towards the front and the front edge 21a of the next sheet piece 21 located towards the back are joined together repeatedly by a non-illustrated joining unit or by hand so as to form an elongated, strip-shaped ply.

As described above, the feed conveyor 14 can swivel centering on the center of curvature of the outer periphery of the auxiliary stand 13, and the swiveling of the feed conveyor 14 can change the inclination angle A of the strip-shaped rubber member 15 with respect to the belt conveyor 12 in a range from 15° to 90°. When the inclination angle A is between 15° and 30°, the strip-shaped ply that is formed is used as a belt layer in a pneumatic tire, whereas when the inclination angle A is 90°, the strip-shaped ply that is formed is used as a carcass layer in a pneumatic tire. When the strip-shaped rubber member 15 is thus formed from the plurality of reinforcing cords 17 and the coating rubber 16 that covers the reinforcing cords 17, allowing the inclination angle A of the strip-shaped rubber member 15 with respect to the belt conveyor 12 to change within a range from 15° to 90° allows for formation of both a belt layer and a carcass layer for a pneumatic tire using the cut sheet pieces 21, thereby promoting dual use of the device.

Figure 2:
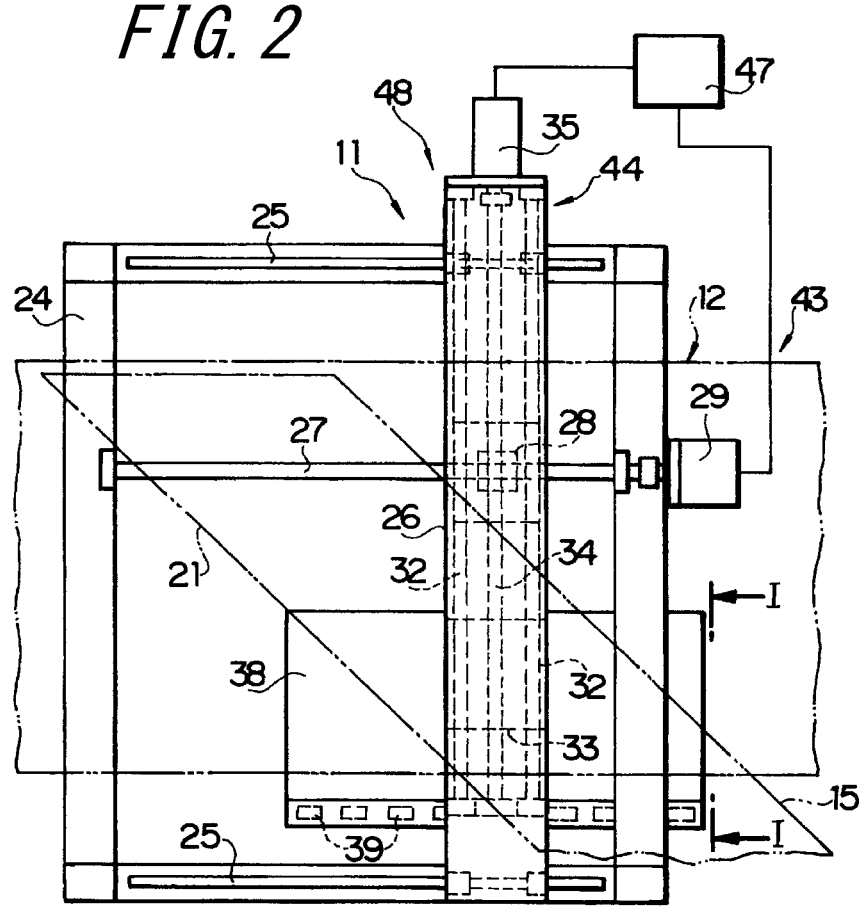
FIG. 2 is a plan view of a transfer unit.
Figure 3:
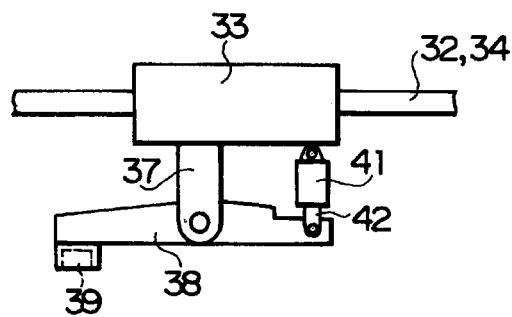
FIG. 3 is a view along arrows I-I in FIG. 2.

In FIGS. 1, 2, and 3, reference number 24 indicates a frame placed so as to straddle the belt conveyor 12. A pair of guide rails 25 extending along the belt conveyor 12 is laid at the left and right edges of the top face of the frame 24. A horizontal slide plate 26 extending to the left and right is slidably supported by the guide rails 25. Reference number 27 indicates a screw shaft rotatably supported by front-back edges of the frame 24. The screw shaft 27 extends in the longitudinal direction (front-back direction) of the belt conveyor 12 and is screwed into a screw block 28 fixed to a central portion of the slide plate 26. Reference number 29 indicates a servomotor fixed to a rear end portion of the frame 24. The screw shaft 27 is connected to an output shaft of the servomotor 29. As a result, when the servomotor 29 operates and the screw shaft 27 rotates, the slide plate 26 moves in the longitudinal direction of the belt conveyor 12, i.e. the front-back direction, while being guided by the guide rails 25.

The slide plate 26 is supported by a pair of horizontal guide rods 32 extending in the width direction of the belt conveyor 12. These guide rods 32 are slidably inserted into a movable body 33. A screw shaft 34 extending parallel to the guide rods 32 is rotatably supported by the slide plate 26 between the guide rods 32. The screw shaft 34 is screwed into the movable body 33. Reference number 35 indicates a servomotor fixed to the right end of the slide plate 26. The screw shaft 34 is connected to an output shaft of the servomotor 35. As a result, when the servomotor 35 operates and the screw shaft 34 rotates, the movable body 33 moves in a direction perpendicular to the longitudinal direction of the belt conveyor 12, i.e. in the horizontal direction, while being guided by the guide rods 32.

A bracket 37 extending downwards is fixed at the bottom face of the movable body 33. The length-direction central portion of a nearly horizontal swinging plate 38 extending in the longitudinal direction (front-back direction) of the belt conveyor 12 is connected to a lower edge portion of the bracket 37. A plurality of magnets 39 serving as a holding member are attached to a width-direction edge portion (left edge portion) of the swinging plate 38 separated equidistantly in the front-back direction. These magnets 39 hold the tip portion of the strip-shaped rubber member 15 from above by attaching to the reinforcing cords 17 (steel cords) in the strip-shaped rubber member 15. Note that the tip portion of the strip-shaped rubber member 15 may be held by attachment by an electromagnet or attachment by a suction pad connected to a vacuum source, or may be held by being sandwiched from above and below by a claw that opens and closes.

Reference number 41 indicates a cylinder extending vertically, a head-side thereof being connected to the movable body 33. A tip of a piston rod 42 in the cylinder 41 is connected to the other width-direction edge portion (right edge portion) of the swinging plate 38. As a result, when the cylinder 41 operates and the piston rod 42 retracts, the swinging plate 38 swings so that a width-direction edge portion thereof lowers and the magnets 39 attach to the tip portion (steel cord) of the strip-shaped rubber member 15. Subsequently, when the cylinder 41 operates and the piston rod 42 projects, only the tip portion of the strip-shaped rubber member 15 to which the magnets 39 are attached is slightly raised. Together, the above-described guide rails 25, slide plate 26, screw shaft 27, screw block 28, and servomotor 29 form a first movement mechanism 43 that moves the swinging plate 38 and magnets 39 in the longitudinal direction (X-axis direction) of the belt conveyor 12, and together the guide rods 32, movable body 33, screw shaft 34, and servomotor 35 form a second movement mechanism 44 that moves the swinging plate 38 and magnets 39 in the width direction (Y-axis direction) of the belt conveyor 12.

Reference number 47 is a control unit, such as a personal computer. The inclination angle A of the strip-shaped rubber member 15 with respect to the longitudinal direction of the belt conveyor 12 and the length-direction transfer amount of the strip-shaped rubber member 15 are stored in the control unit 47. Based on the inclination angle A and the transfer amount, the control unit 47 calculates a transfer amount component $X_t$ in the same direction as the longitudinal direction (X-axis direction) of the belt conveyor 12 and a transfer amount component $Y_t$ in the width direction (Y-axis direction) of the belt conveyor 12. The control unit 47 also outputs the results of calculation to the servomotors 29 and 35 in the first and second movement mechanisms 43 and 44 so as to drive the first and second movement mechanisms 43 and 44. As a result, the slide plate 26 moves a distance equaling the transfer amount component $X_t$ along the X-axis, whereas the movable body 33 moves a distance equaling the transfer amount component $Y_t$ along the Y-axis, so that while being held by the magnets 39 in a transfer unit 48, the tip portion of the strip-shaped rubber member 15 moves to near the other width-direction edge of the belt conveyor 12. The strip-shaped rubber member 15 is thus transferred in the longitudinal direction by composition amount of the above-described transfer amount components $X_t$ and $Y_t$, i.e. the transfer amount, so that the strip-shaped rubber member 15 is transferred a predetermined length and placed on the belt conveyor 12.

When a change occurs in the width of the strip-shaped rubber member 15, the inclination angle A, the transfer amount, or the like, the control unit 47 performs the calculation again and controls the first and second movement mechanisms 43 and 44 based on the results of calculation. Together, the above-described frame 24, swinging plate 38, magnets 39, and first and second movement mechanisms 43 and 44 form the transfer unit 48 that transfers the strip-shaped rubber member 15 onto the belt conveyor 12 by moving the strip-shaped rubber member 15, which is at an inclination with respect to the belt conveyor 12, in the longitudinal direction of the strip-shaped rubber member 15 while holding the tip portion thereof. Note that in the present invention, the transfer unit may be formed from a swinging frame and a holding body. In this case, the swinging frame is able to swing integrally with the feed conveyor 14 by being attached to a frame of the feed conveyor 14 and extends along the feed conveyor 14 from the feed conveyor 14 at least to the other width-direction edge of the belt conveyor 12. The holding body is movably supported by the swinging frame and able to transfer the strip-shaped rubber member while holding the tip portion thereof.

Figure 4:
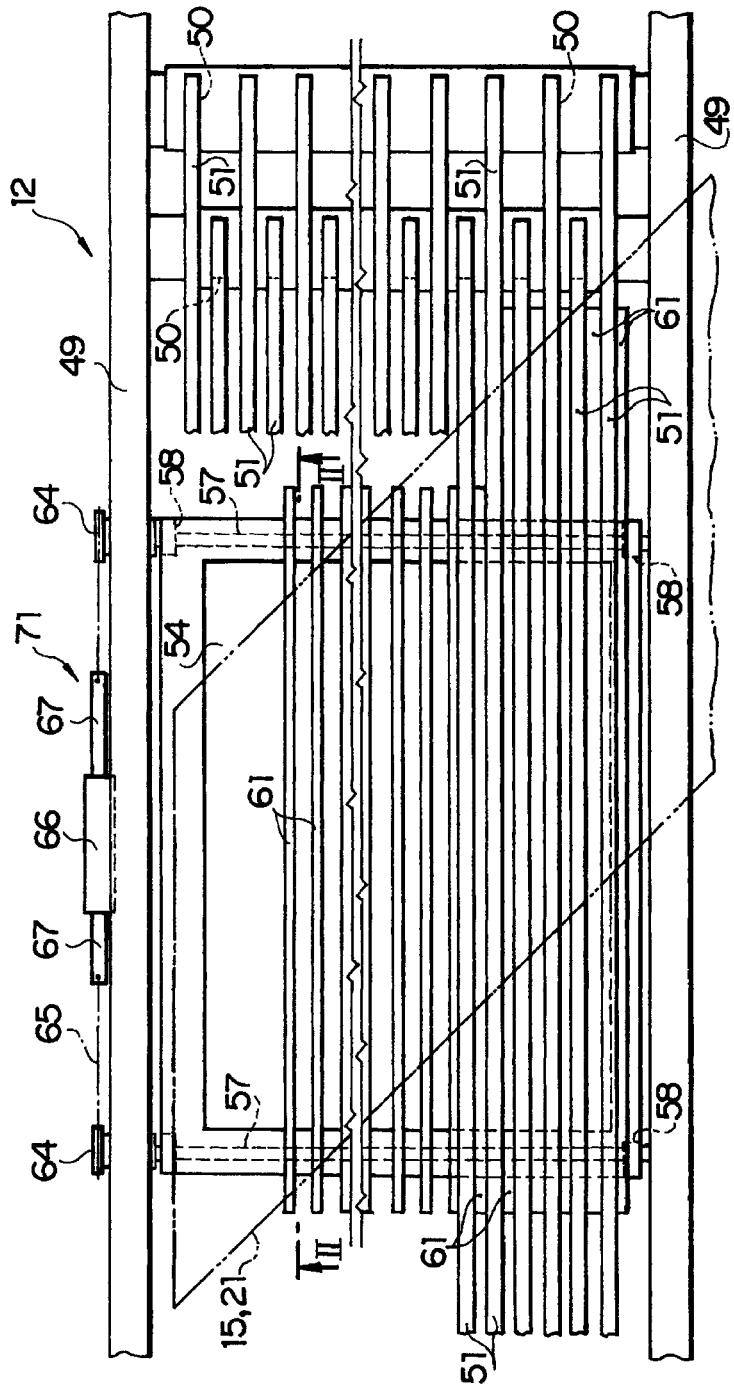
FIG. 4 is a partially cutaway plan view of a belt conveyor.
Figure 5:
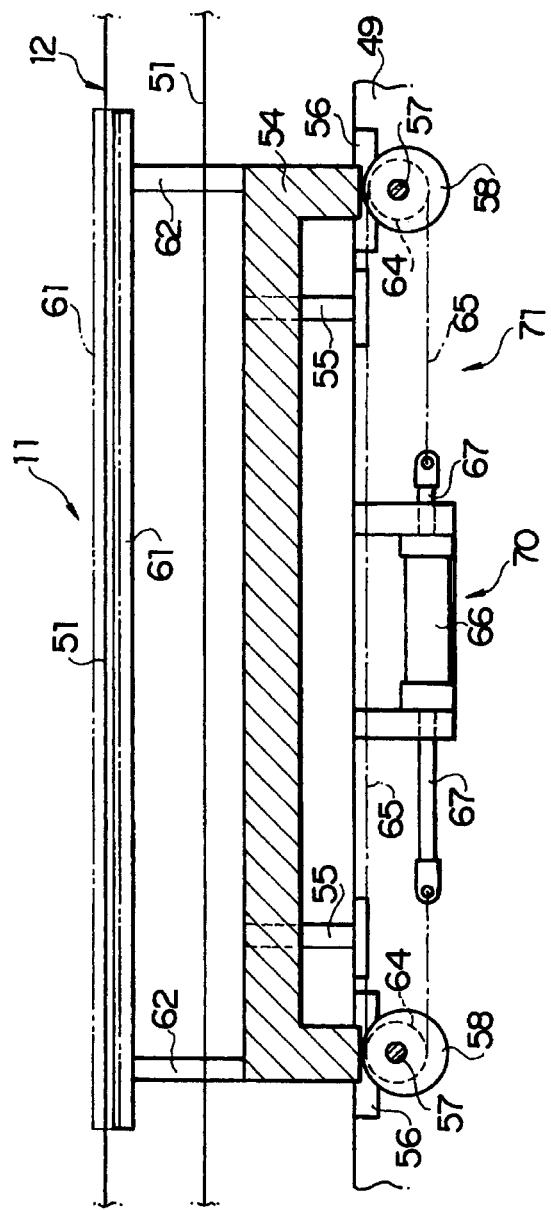
FIG. 5 is a cross-sectional view along arrows II-II in FIG. 4.

As illustrated in FIGS. 4 and 5, the belt conveyor 12 is formed by a frame 49 extending in the front-back direction, a plurality of pulleys 50 rotatably supported by the frame 49 and placed at the front and back ends of the belt conveyor 12 separated equidistantly in the width direction of the belt conveyor 12, and a plurality of thin width belts 51 each spreading between corresponding pulleys 50 and extending in parallel to each other in the longitudinal direction (front-back direction) of the belt conveyor 12. Synchronously with one of the pulleys 50 being driven to rotate by the drive source, the belts 51 each run in the longitudinal direction (front-back direction) and transport the cut-off sheet piece 21 in the longitudinal direction of the belt conveyor 12.

Reference number 54 indicates a lifting frame placed immediately below the movement area of the swinging plate 38 and the magnets 39. Guide rods 55 attached to the frame 49 and extending vertically are slidably inserted into the lifting frame 54. As a result, the lifting frame 54 can rise or lower while being guided by the guide rods 55. Reference number 56 indicates bearings fixed to the frame 49 and placed at a distance in the front-back direction. Rotating shafts 57 extending in the width direction (horizontal direction) of the belt conveyor 12 are respectively supported rotatably by the bearings 56. A plurality of disc-shaped eccentric cams 58, the outer periphery of which touches the bottom face of the lifting frame 54, are fixed to the rotating shafts 57. The eccentric cams 58 are eccentric with respect to the central axis of the rotating shafts 57 by a predetermined amount.

Reference number 61 indicates a plurality of horizontal support members extending in parallel to the belts 51 of the belt conveyor 12. These support members 61 are respectively placed near the belts 51 at one width-direction side of each belt 51, at least at one width-direction side of the belt conveyor 12, here at one width-direction edge portion and at the width-direction central portion of the belt conveyor 12, excluding the other width-direction edge portion. Reference number 62 indicates a plurality of connecting bodies extending vertically. The upper edges of these connecting bodies 62 are connected to the front and back edge portions of the support members 61, whereas the lower edges are connected to the lifting frame 54. As a result, when the lifting frame 54 rises or lowers, the support members 61 and the connecting bodies 62 rise or lower integrally with the lifting frame 54. When the lifting frame 54, the support members 61, and the connecting bodies 62 rise, the upper side portion of the support members 61 projects upwards from the conveying surface of the belts 51 positioned at the other width-direction side of the support members 61, whereas when the lifting frame 54, the support members 61, and the connecting bodies 62 lower, the entire support members 61 submerge below the conveying surface of the belts 51 positioned at the other width-direction side of the support members 61.

The support members 61 placed at one width-direction side of the belts 51 are thus projectable from the conveying surface of the belts 51. Reference number 64 indicates sprockets fixed to the rotating shafts 57. A chain 65 is spread between the sprockets 64 as a carrier that extends in the front-back direction. Reference number 66 indicates a double rod cylinder attached to the frame 49. The edges of the chain 65 are respectively connected to the tips of piston rods 67 in the cylinder 66. As a result, when the cylinder 66 operates, a driving force for running is applied to the chain 65 from the piston rods 67, and the chain 65 runs. By the chain 65 thus running, the rotating shafts 57 and the eccentric cams 58 integrally rotate in synchronization, so that the support members 61 translate vertically (rise or lower) due to synchronous rotation of the eccentric cams 58.

As a whole, the chain 65 that synchronously rotates the above-described eccentric cams 58 and the cylinder 66 that applies a driving force for running to the chain 65 form a movement mechanism 70. Furthermore, as a whole, the plurality of eccentric cams 58 that, by rotating synchronously, cause the support members 61 to translate vertically, along with the movement mechanism 70 that synchronously rotates the eccentric cams 58, form a lifting/lowering unit 71 that lifts and lowers the support members 61. As described above, by forming the movement mechanism 70 from the chain 65 and the cylinder 66 and forming the lifting/lowering unit 71 from the eccentric cams 58 and the movement mechanism 70, the lifting/lowering unit 71 that lifts and lowers the support members 61 can be manufactured inexpensively and with a simple structure. Note that in the present invention, the movement mechanism may be formed from a timing belt serving as a carrier and from a drive motor that applies a driving force for running to the timing belt. Furthermore, in the present invention, the lifting/lowering unit may be formed from a screw mechanism, a rack/pinion mechanism, or a fluid cylinder.

As described above, the support members 61 that are projectable from the conveying surface of the belts 51 are placed at one width-direction side of the belts 51, and the lifting/lowering unit 71 that lifts and lowers the support members 61 is also provided. The support members 61 are lifted by the lifting/lowering unit 71 to project from the conveying surface of the belts 51, so that at the time of transfer of the strip-shaped rubber member 15 onto the belt conveyor 12, the strip-shaped rubber member 15 is raised from the conveying surface of the belts 51 by the support members 61, thereby separating the strip-shaped rubber member 15 from the conveying surface from above. Therefore, the strip-shaped rubber member 15 is not in sliding contact with the conveying surface of the belts 51 at the time of transfer. As a result, a situation whereby the belts 51 are dragged by the strip-shaped rubber member 15 so that one width-direction edge portion thereof is turned up can be averted, thus easily and reliably preventing defective cutting and defective transport of the strip-shaped rubber member 15.

Here, when the belt conveyor 12 includes the plurality of belts 51 in order to suppress twisting of the belt, as described above, the belts 51 positioned within the width of the belt conveyor 12 at one width-direction side thereof easily turn up. Therefore, as described above, the support members 61 are placed at one width-direction side of each of the belts 51 positioned at least at one width-direction side of the belt conveyor 12, so as to reliably prevent the belts 51 that easily turn up from doing so. Note that in the present invention, one wide belt may be used as the belt conveyor 12, in which case one support member would be placed at one width-direction side of the wide belt.

Next, operations of Embodiment 1 are described.

It is assumed that the feed conveyor 14 and the strip-shaped rubber member 15 are inclined at an inclination angle A with respect to the belt conveyor 12, and that a tip of the strip-shaped rubber member 15 is positioned above the anvil 19. Next, by a control signal from the control unit 47, the first and second movement mechanisms 43 and 44 are operated, causing the magnets 39 to move to a position immediately above the tip portion of the strip-shaped rubber member 15. Subsequently, the cylinder 41 is operated and retracts the piston rod 42, lowering the magnets 39 until they firmly attach to the tip portion of the strip-shaped rubber member 15. As a result, the magnets 39 in the transfer unit 48 hold the tip portion of the strip-shaped rubber member 15 by attachment. Next, the piston rod 42 in the cylinder 41 is caused to project so as to raise the magnets 39 by a predetermined amount, so that the tip portion of the strip-shaped rubber member 15 is raised above the conveying surface of the belts 51 by the magnets 39.

At this point, the cylinder 66 is operated and runs the chain 65, causing the rotating shafts 57 and the eccentric cams 58 to rotate integrally. As a result, the support members 61 that were submerged below the conveying surface of the belts 51 rise due to rotation of the eccentric cams 58, so that the upper side portion of the support members 61 projects above the conveying surface of the belts 51. Next, based on the inclination angle A and the transfer amount, the control unit 47 calculates a transfer amount component Xt in the same direction as the longitudinal direction (X-axis direction) of the belt conveyor 12 and a transfer amount component Yt in the width direction (Y-axis direction) of the belt conveyor 12. The control unit 47 also outputs the results of calculation to the servomotors 29 and 35 in the first and second movement mechanisms 43 and 44 so as to drive the servomotors 29 and 35.

As a result, the magnets 39 in the transfer unit 48 move the strip-shaped rubber member 15, while holding the tip portion thereof, a distance equaling the transfer amount component Xt along the X-axis and a distance equaling the transfer amount component Yt along the Y-axis, so that the strip-shaped rubber member 15 is transferred in the longitudinal direction by the sum amount of the above-described transfer amount components Xt and Yt, i.e. the transfer amount. In this way, the strip-shaped rubber member 15 is transferred onto the belt conveyor 12. This transfer stops when the tip of the strip-shaped rubber member 15 reaches an extension of the right edge 21d of the sheet piece 21 that has already been cut off. At this point, the tip portion of the strip-shaped rubber member 15 is raised while being attached to the magnets 39, as described above, and therefore is not in sliding contact with the belts 51. Due to its own weight, however, the portion of the strip-shaped rubber member 15 after the tip portion may slide against the conveying surface of the belts 51 with a certain pressure, and as a result, the belts 51 may be dragged by the strip-shaped rubber member 15 at the time of transfer of the strip-shaped rubber member 15, causing a width-direction edge portion of the belts 51 to turn up.

In the present embodiment, however, the support members 61 are caused to rise by rotation of the eccentric cams 58 in the lifting/lowering unit 71, as described above, so that the upper side portion of the support members 61 projects above the conveying surface of the belts 51. Therefore, the portion of the strip-shaped rubber member 15 after the tip portion is raised above the conveying surface of the belts 51 by the support members 61 at the time of transfer by the transfer unit 48 and is not in sliding contact with the conveying surface of the belts 51. As a result, a situation whereby the belts 51 are dragged by the strip-shaped rubber member 15 so that one width-direction edge portion thereof is turned up can be averted, thus easily and reliably preventing defective cutting and defective transport of the strip-shaped rubber member 15. Note that at this point, since the tip portion of the strip-shaped rubber member 15 is raised by being attached to the magnets 39, as described above, it poses no problem if no support member is provided at a position overlapping with the tip portion of the strip-shaped rubber member 15, i.e. at one width-direction side of the belts 51 at the other width-direction edge portion of the belt conveyor 12.

Next, by moving the cutter 20 of the cutting unit 18 along the anvil 19, the strip-shaped rubber member 15 on the belt conveyor 12 is cut by the cutter 20 in the longitudinal direction of the belt conveyor 12 at one width-direction side of the belt conveyor 12, so that a sheet piece 21 in the shape of a parallelogram is cut from the strip-shaped rubber member 15. At this point, the tip portion of the strip-shaped rubber member 15 is separated from the magnets 39 by a non-illustrated separation mechanism and falls onto the belt conveyor 12. Subsequently, the belt conveyor 12 is operated, the cut-off sheet piece 21 is transported by the belt conveyor 12 in the longitudinal direction of the belt conveyor 12, forwards in this example, and the back edge 21b of the sheet piece 21 located towards the front and the front edge 21a of the sheet piece 21 located towards the back are joined together by a non-illustrated joining unit or by hand so as to form an elongated, strip-shaped ply. Subsequently, such a strip-shaped ply is used in a belt layer or a carcass layer of a pneumatic tire.

INDUSTRIAL APPLICABILITY

The present invention can be applied in an industrial field in which a strip-shaped rubber member is transferred onto a belt conveyor at an inclination with respect to the belt conveyor and then cut along the belt conveyor so as to cut off sheet pieces one after another.

REFERENCE SIGNS LIST

11: Transfer cutting device
12: Belt conveyor
15: Strip-shaped rubber member
16: Coating rubber
17: Reinforcing cords
18: Cutting unit
21: Sheet piece
48: Transfer unit
51: Belt
58: Eccentric cam
61: Support member
65: Carrier
66: Cylinder
70: Movement mechanism
71: Lifting/lowering unit
A: Inclination angle

The invention claimed is:
1. A method for transfer cutting a strip-shaped rubber member, comprising the steps of:
transferring the strip-shaped rubber member onto a belt conveyor by a transfer unit moving the strip-shaped rubber member in a longitudinal direction of the strip-shaped rubber member while holding a tip portion thereof, the strip-shaped rubber member being at an inclination with respect to the belt conveyor, the belt conveyor including a belt running in a longitudinal direction of the belt conveyor;
cutting off a sheet piece from the strip-shaped rubber member by a cutting unit cutting the strip-shaped rubber member on the belt conveyor in the longitudinal direction of the belt conveyor at one width-direction side of the belt conveyor, yielding a cut-off sheet piece; and
transporting, by the belt conveyor, the cut-off sheet piece in the longitudinal direction of the belt conveyor, wherein
at a time of transfer of the strip-shaped rubber member by the transfer unit, a support member is lifted by a lifting/lowering unit to project from a conveying surface of the belt, the support member being provided at one width- direction side of the belt and being projectable from the conveying surface of the belt, so that the strip-shaped rubber member is raised from the conveying surface of the belt.

2. A device for transfer cutting a strip-shaped rubber member, comprising:
- a belt conveyor including a belt running in a longitudinal direction of the belt conveyor;
- a transfer unit configured to transfer the strip-shaped rubber member onto the belt conveyor by moving the strip-shaped rubber member in a longitudinal direction of the strip-shaped rubber member while holding a tip portion thereof, the strip-shaped rubber member being at an inclination with respect to the belt conveyor; and
- a cutting unit configured to cut off a sheet piece from the strip-shaped rubber member by cutting the strip-shaped rubber member on the belt conveyor in the longitudinal direction of the belt conveyor at one width-direction side of the belt conveyor, yielding a cut-off sheet piece, wherein the belt conveyor transports the cut-off sheet piece in the longitudinal direction of the belt conveyor, a support member, at one width-direction side of the belt, projectable from a conveying surface of the belt, is provided along with a lifting/lowering unit configured to lift and lower the support member, and at a time of transfer of the strip-shaped rubber member by the transfer unit, the support member is lifted by the lifting/lowering unit to project from the conveying surface of the belt, so that the strip-shaped rubber member is raised from the conveying surface of the belt.

3. The device for transfer cutting a strip-shaped rubber member according to claim 2, wherein the lifting/lowering unit comprises a plurality of eccentric cams that, by rotating synchronously, cause the support member to translate vertically, and a movement mechanism that causes the eccentric cams to rotate synchronously.

4. The device for transfer cutting a strip-shaped rubber member according to claim 3, wherein the movement mechanism comprises a carrier that, by running, causes the eccentric cams to rotate synchronously, and a cylinder that applies a driving force for running to the carrier.

5. The device for transfer cutting a strip-shaped rubber member according to claim 2, wherein the belt conveyor includes a plurality of belts running synchronously in parallel, and the support member is provided at one width-direction side of each of the belts positioned at least at one width-direction side portion of the belt conveyor.

6. The device for transfer cutting a strip-shaped rubber member according to claim 2, wherein the strip-shaped rubber member comprises a plurality of reinforcing cords extending in the longitudinal direction of the strip-shaped rubber member and a coating rubber covering the reinforcing cords, and an inclination angle of the strip-shaped rubber member with respect to the belt conveyor is changeable within a range of 15° to 90°.

* * * * *